A. B. FIELD.
SHAFT OSCILLATOR FOR ROTARIES.
APPLICATION FILED MAR. 21, 1918.

1,281,326.

Patented Oct. 15, 1918.

Witnesses
J. B. Fleming
Margaret Vetter

Inventor
A. B. Field
by Bakewell, Byrnes, Parmelee
Attys.

UNITED STATES PATENT OFFICE.

ALLAN BERTRAM FIELD, OF CHESHIRE, ENGLAND.

SHAFT-OSCILLATOR FOR ROTARIES.

1,281,326.

Specification of Letters Patent.

Patented Oct. 15, 1918.

Application filed March 21, 1918. Serial No. 223,796.

*To all whom it may concern:*

Be it known that I, ALLAN BERTRAM FIELD, a subject of the King of England, residing in Cheshire, England, have invented certain new and useful Improvements in Shaft-Oscillators for Rotaries, of which the following is a specification.

It is well-known that it is desirable to impart to the rotating shaft of an electrical rotary converter, a restricted movement in the direction of its axis of rotation. To this end the machine is intentionally so constructed that the armature tends to take up a definite axial position but is free to receive a displacement from this position upon the application of a force which generally must increase steadily with increasing displacement; a device is then employed to produce periodically such a displacement and thereafter allow the armature to return to the position stated. The present invention relates to a device of the type just above defined, but has for its object the substitution of a fluid contact with the shaft for the mechanical contact heretofore usually employed.

According to the present invention, in a device of the type defined, fluid under pressure (which pressure may conveniently be generated by the rotation of the shaft) is applied to a plunger-and-cylinder to move the shaft axially, of which parts the plunger or the cylinder is integral with or is directly attached to the shaft. If the pressure be produced by the rotation of the shaft, it may, in one embodiment of this invention, be that of a lubricant in a bearing of the shaft where, as is known, a high pressure is produced by the rotation of the shaft if the bearing is properly lubricated.

In one development of the present invention means operated by the rotation of the shaft are employed to control the application of fluid under pressure to a plunger to effect the desired axial displacement of the shaft.

Conveniently, the cylinder containing the plunger, or the plunger itself, is provided with a discharge duct having a valve loaded so as normally to close the duct, in combination with means operated automatically by the discharge of fluid past the valve to relieve the valve of its load during the continuance of its discharge. The said duct may be arranged to discharge into a chamber that is closed, except for a restricted escape, and the said means for relieving the valve of its load is then operated by the fluid-pressure within the chamber.

According to one feature of this invention, the above referred to fluid-pressure generated between the shaft and its bearing is transmitted to the plunger through a duct piercing the shaft, and the duct may be provided with a valve such that centrifugal force due to the rotation of the shaft tends to close it.

One embodiment of the present invention, as applied to the shaft of a rotary converter, is now described and illustrated in the accompanying drawings, of which—

Figure 1:
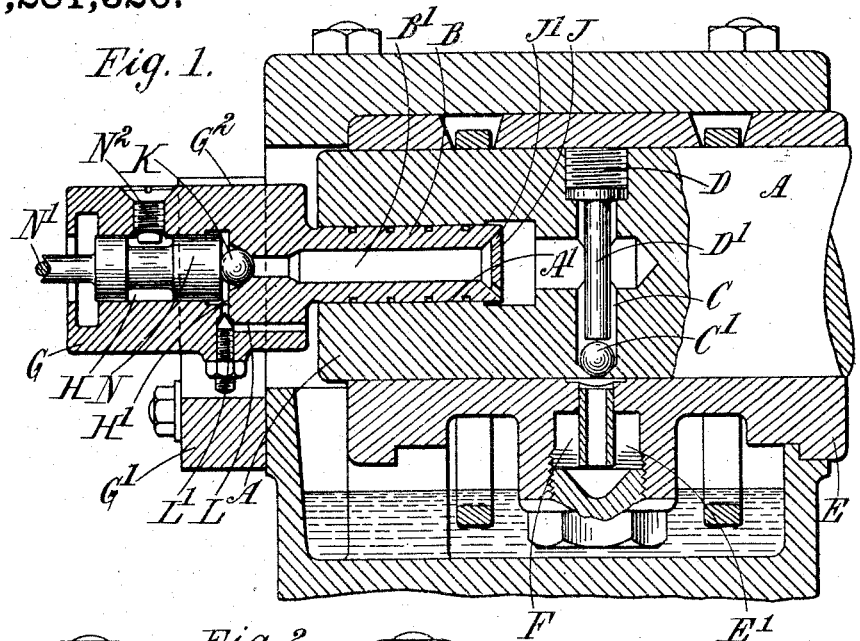
Figure 1 is a longitudinal vertical section through one end of a shaft and its bearing and the displacement device.
Figure 2:
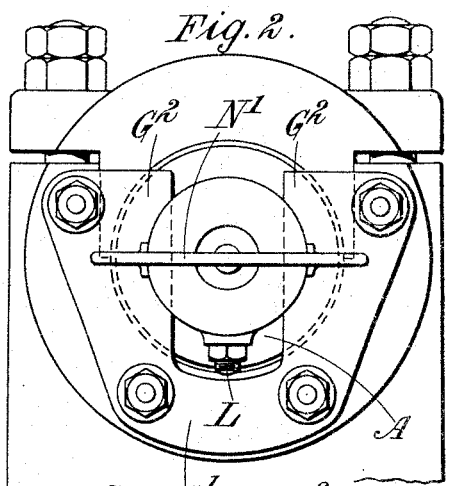
Fig. 2 is an end elevation of the parts shown in Fig. 1.
Figure 4:
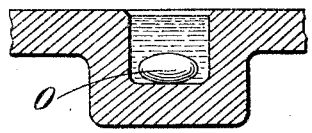
Fig. 4 is a sectional view of a modified detail of construction.

A journal at one end of the shaft is shown at A and contains a cylindrical axial cavity $A^1$ to constitute a cylinder within which a plunger B is to work. Near to the inner end of the cavity $A^1$ is a transverse duct C connecting the interior of the cavity with the outer surface of the journal and close to its outer end the duct is formed to provide a seating for a ball $C^1$ so that the latter acts as a non-return valve therein. The seating is brought as close as conveniently practicable to the outer face of the journal. Diametrically opposite to the said seating, the transverse duct is, for facility of construction, continued out to the surface of the journal. It is, however, here closed by a screwed spindle D, whose stem $D^1$ serves to keep the ball from leaving the duct.

The bearing-bush E surrounding the journal is provided with a small oil-well $E^1$ communicating with the bearing surface at a point which registers with the duct C at every revolution of the shaft. A tube F dips into the well so that the latter constitutes an air-lock. Any convenient means may be adopted to insure the presence of air in the well, by making good leakage or absorption that may occur during use. A substantially cylindrical block of metal G is engaged with the housing of the bearing by a fork $G^1$, whose prongs $G^2$ engage with the sides of the block by means of flats therein in such a way that the block has a little lateral play as well as up-and-down play to enable it to aline itself freely but yet to be held against displacement in the direction of the rotational axis of the shaft. At the opposite end of the block is a cylindrical extension B which forms a plunger fitting accurately in the cavity $A^1$ aforesaid in the shaft. The plunger contains an axial duct $B^1$ communicating at its outer extremity with the end face of the plunger and at its inner extremity with a chamber H within the block. The opening in the end face of the plunger is preferably flared and a central portion of its area closed by a plate J, supported in any convenient manner, so as to leave an annular entrance to the duct $B^1$, the outer boundary of which entrance is substantially the outer periphery of the plunger. The object of this is to insure that oil rather than air shall enter the duct. Centrifugal force in the cylinder tends to keep air in the center and oil at the periphery. At its inner end the duct $B^1$ is provided with a ball-valve K whose seating is toward the chamber H so that pressure within the latter tends to hold the ball upon its seat. The chamber is provided with a restricted escape, which, in the construction illustrated, is in the form of a right angled duct L fitted with a needle-valve $L^1$.

The chamber has an opening toward the left-hand end, as viewed in the drawing, but contains a piston N fitted fluid-tight in it and spring-pressed by a spring $N^1$ so as normally to bear against the ball K. Any convenient means is employed to limit the travel of the piston to the left-hand so that it only moves sufficiently far to leave the ball-valve at K free to open fully. The screw $N^2$ serves this purpose in the example shown. The diameter of the chamber is enlarged at $H^1$ so that the piston N shall not interrupt communication between the escape L and the ball-valve K.

The operation of the device is as follows:—

When the shaft is rotating, centrifugal force holds the ball-valve at $C^1$ closed but with a pressure such that when the opening of the duct C reaches the point where high oil pressure is generated, this pressure forces open the ball valve and drives a small quantity of oil into the cavity $A^1$. Owing to the existence of the air-lock at $E^1$ an element of volumetric elasticity is introduced which serves to maintain the oil-pressure, even with a considerable rate of pumping of the oil. Various means of obtaining this slight volumetric elasticity otherwise than by an air-lock are available.

Figure 3:
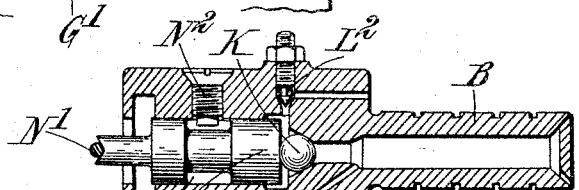
Fig. 3 is a view similar to Fig. 1 of a slightly modified construction.

Thus, instead of relying upon the trapping of air in the well $E^1$ it may be preferred to immerse in the oil a compressible closed hollow capsule which may be made of steel, as is indicated at O in Fig. 3.

The repeated injections of small quantities of oil into the cavity $A^1$ gradually force the shaft away from the plunger B, so that the latter is increasingly extruded, the tendency for the oil to escape past the ball-valve K being resisted by the spring-loading $N^1$. When, however, the axial displacement of the shaft has reached a value involving for its maintenance, the predetermined oil pressure, the ball K is pressed off its seat and the oil pressure immediately applied, not merely to the area of the valve at K, but to the piston N which is intentionally made of considerably larger diameter than the valve. This is immediately thrust outward, relieving the ball of its spring load, and allowing the oil slowly to escape by the escape-tube from the chamber H and cavity $B^1$ and thus allowing the shaft to float back to its original position. The supply of oil through the valve at $C^1$ is at a considerably lower rate than its escape at L, so that the pressure within the chamber H gradually falls and, the spring $N^1$ asserting itself on the piston, the ball K is returned to its seat after the shaft has floated back. The cycle of operations is then automatically repeated.

Any small leakage that may occur past the ball K will be carried off by the escape L without generating sufficient pressure in $H^1$ to operate the piston N' and relieve the ball of its loading.

In the modified construction shown in Fig. 3, the fluid under pressure, conveniently oil, is introduced into the duct $B^1$ by means of an inlet-pipe P connected with any convenient source of supply, secured by a union $P^1$ to the block G and having an adjustable needle-valve $P^2$ to throttle the supply. The object of this is to prevent the rate of supply being too rapid to allow of the return of the shaft upon the plunger B. The regulatable escape is provided by an adjustable needle-valve situated at $L^2$ in the present construction and operates just as does the valve $L^1$ in Fig. 1.

The above described constructions are given by way of illustration only. Any convenient means may be employed to generate the required fluid-pressure, but the above described means is that preferred. Where other means are employed the fluid may be any that is convenient, such for example as air. Further, other means may be employed to give the periodic character to the application and release of pressure to the plunger, but such means will preferably be controlled or operated by the changes of pressure. Where oil is used as the fluid and is made to escape, as in the above described construction, periodically from the device, it is conveniently returned to the bearing or to an oil-well for lubricating purposes.

What I claim as my invention and desire to secure by Letters Patent is:—

1. In a machine having a revolving shaft the combination of a plunger-and-cylinder device having one of its said two parts so carried by the shaft as to have its own longitudinal axis coincident with that of the shaft, means for delivering fluid under pressure to the interior of the said cylinder, and means to relieve the pressure within the cylinder periodically.

2. In a machine having a revolving shaft the combination of a plunger-and-cylinder device having one of its said two parts so carried by the shaft as to have its own longitudinal axis coincident with that of the shaft, means for delivering fluid under pressure to the interior of the said cylinder, and automatic means for relieving the pressure in the cylinder periodically.

3. In a machine having a revolving shaft the combination of a plunger-and-cylinder device having one of its said two parts integral with the shaft and so situated as to have its own longitudinal axis coincident with that of the shaft, means for delivering fluid under pressure to the interior of the said cylinder, and means to relieve the pressure within the cylinder periodically.

4. In a machine having a revolving shaft the combination of a plunger-and-cylinder device having one of its said two parts so carried by the shaft as to have its own longitudinal axis coincident with that of the shaft, means operated by the rotation of the shaft to generate fluid pressure and deliver it to the interior of the said cylinder and means to relieve the pressure within the cylinder periodically.

5. In a machine having a revolving shaft the combination of a plunger-and-cylinder device whereof the cylinder is carried by the shaft with its longitudinal axis coincident with that of the shaft, a duct within the shaft having its delivery end discharging into the interior of the said cylinder and having its inlet end opening at a point on the periphery of the shaft which point runs in a bearing of the shaft so as to register with a cavity in the said bearing situated where the pressure of the lubricant is rendered by the rotation of the shaft higher than is due merely to the load on the shaft and which duct has a non-return valve between its inlet and delivery ends and means to relieve the pressure within the cylinder periodically.

6. In a machine having a revolving shaft the combination of a plunger-and-cylinder device whereof the cylinder is carried by the shaft with its longitudinal axis coincident with that of the shaft, a duct within the shaft having its delivery end discharging into the interior of the said cylinder and having its inlet end opening at a point on the periphery of the shaft which point runs in a bearing of the shaft so as to register with a cavity in the said bearing situated where the pressure of the lubricant is rendered by the rotation of the shaft higher than is due merely to the load on the shaft, which cavity contains a resiliently compressible body and which duct has a non-return valve between its inlet and delivery ends and means to relieve the pressure within the cylinder periodically.

7. In a machine having a revolving shaft the combination of a plunger-and-cylinder device whereof the cylinder is carried by the shaft with its longitudinal axis coincident with that of the shaft, a duct within the shaft having its delivery end discharging into the interior of the said cylinder and having its inlet end opening at a point on the periphery of the shaft which point runs in a bearing of the shaft so as to register with a cavity in the said bearing situated where the pressure of the lubricant is rendered by the rotation of the shaft higher than is due merely to the load on the shaft, which cavity is formed to have its opening at the bearing face of less pyrometer than at a point more remote from the bearing face and has its said opening fitted fluid tight with a tube open at both ends communicating with the interior of the cavity and with the bearing face and which duct has a non-return valve between its inlet and delivery ends and means to relieve the pressure within the cylinder periodically.

8. In a machine having a revolving shaft the combination of a plunger-and-cylinder device having one of its said two parts so carried by the shaft as to have its own longitudinal axis coincident with that of the shaft, means for delivering fluid under pressure to the interior of the said cylinder, a discharge duct whose inlet communicates with the interior of the cylinder and whose outlet communicates through a non-return valve to a chamber closed by a spring-returned piston fitted fluid tight but slidably therein of larger diameter than is the seating of the said valve and operatively connected with the latter to close it under the action of the said spring and which chamber is provided with a restricted escape-orifice.

9. In a machine having a revolving shaft the combination of a plunger-and-cylinder device having one of its said two parts so carried by the shaft as to have its own longitudinal axis coincident with that of the shaft, means for delivering fluid under pressure to the interior of the said cylinder, a discharge duct situated axially within the said plunger having its inlet communicating with the interior of the cylinder and its outlet communicating through a non-return valve to a chamber closed by a spring-returned piston fitted fluid tight but slidably therein of larger diameter than is the seating of the said valve and operatively connected with the latter to close it under the action of the said spring and which chamber is provided with a restricted escape-orifice.

In testimony whereof I affix my signature.

ALLAN BERTRAM FIELD.